United States Patent
Kwon et al.

(10) Patent No.: US 7,620,872 B2
(45) Date of Patent: Nov. 17, 2009

(54) APPARATUS AND METHOD FOR SELECTING REDUNDANCY VERSION

(75) Inventors: Sung-Lark Kwon, Seoul (KR); Hee-Gul Park, Gyeonggi-Do (KR); Hong-Jik Kim, Seoul (KR); Hoo-Young Jeong, Gyeonggi-Do (KR)

(73) Assignee: LG-Nortel Co., Ltd., Seoul (KR)

( * ) Notice: Subject to any disclaimer, the term of this patent is extended or adjusted under 35 U.S.C. 154(b) by 509 days.

(21) Appl. No.: 11/322,272

(22) Filed: Dec. 29, 2005

(65) Prior Publication Data
US 2006/0150051 A1 Jul. 6, 2006

(30) Foreign Application Priority Data
Dec. 30, 2004 (KR) .................. 10-2004-0116559

(51) Int. Cl.
*H03M 13/00* (2006.01)
(52) U.S. Cl. ..................................... 714/751
(58) Field of Classification Search .................. 714/751
See application file for complete search history.

(56) References Cited

U.S. PATENT DOCUMENTS

| | | | | |
|---|---|---|---|---|
| 5,600,663 | A * | 2/1997 | Ayanoglu et al. | 714/774 |
| 5,729,557 | A * | 3/1998 | Gardner et al. | 714/774 |
| 5,828,677 | A * | 10/1998 | Sayeed et al. | 714/774 |
| 6,625,777 | B1 * | 9/2003 | Levin et al. | 714/774 |
| 6,671,849 | B2 * | 12/2003 | Tripathi et al. | 714/746 |
| 6,678,249 | B2 * | 1/2004 | Toskala et al. | 370/236 |
| 6,697,984 | B1 * | 2/2004 | Sim et al. | 714/751 |
| 6,697,986 | B2 * | 2/2004 | Kim et al. | 714/751 |
| 6,697,987 | B2 * | 2/2004 | Lee et al. | 714/751 |
| 6,697,988 | B2 * | 2/2004 | Kim et al. | 714/752 |
| 6,700,867 | B2 * | 3/2004 | Classon et al. | 370/216 |
| 6,735,180 | B1 * | 5/2004 | Malkamaki et al. | 370/282 |
| 6,892,341 | B2 * | 5/2005 | Golitschek et al. | 714/748 |
| 6,915,477 | B2 * | 7/2005 | Gollamudi et al. | 714/774 |
| 7,000,173 | B2 * | 2/2006 | Buckley et al. | 714/790 |
| 7,000,174 | B2 * | 2/2006 | Mantha et al. | 714/790 |
| 7,002,923 | B2 * | 2/2006 | Golitschek et al. | 370/253 |
| 7,007,216 | B2 * | 2/2006 | Hong | 714/748 |
| 7,099,298 | B2 * | 8/2006 | Kim | 370/342 |
| 7,131,049 | B2 * | 10/2006 | Kim et al. | 714/751 |
| 7,133,462 | B2 * | 11/2006 | Ha et al. | 375/295 |
| 7,152,196 | B2 * | 12/2006 | Wu et al. | 714/748 |
| 7,155,655 | B2 * | 12/2006 | Cheng | 714/748 |
| 7,165,204 | B2 * | 1/2007 | Cudak et al. | 714/751 |
| 7,200,789 | B2 * | 4/2007 | Kim et al. | 714/748 |
| 7,350,125 | B2 * | 3/2008 | Jang et al. | 714/748 |
| 7,359,327 | B2 * | 4/2008 | Oshiba | 370/235 |

FOREIGN PATENT DOCUMENTS

WO 01/91355 11/2001

* cited by examiner

*Primary Examiner*—Joseph D. Torres
(74) *Attorney, Agent, or Firm*—Lee, Hong, Degerman, Kang & Waimey

(57) ABSTRACT

An apparatus and method for maximizing throughout for HARQ transmissions is provided. Systematic and prodeduralized RV selection is facilitated by determining the parameter "s" by using two important factors affecting the system throughout, specifically the coding gain varying according to the code rate and the balance between energy per systematic bit and energy per parity bit.

9 Claims, 3 Drawing Sheets

FIG. 3

| $X_{rv}$ (value) | s | r | b |
|---|---|---|---|
| 0 | 1 | 0 | 0 |
| 1 | 0 | 0 | 0 |
| 2 | 1 | 1 | 1 |
| 3 | 0 | 1 | 1 |
| 4 | 1 | 0 | 1 |
| 5 | 1 | 0 | 2 |
| 6 | 1 | 0 | 3 |
| 7 | 1 | 1 | 0 |

FIG. 4

| $X_{rv}$ (value) | s | r |
|---|---|---|
| 0 | 1 | 0 |
| 1 | 0 | 0 |
| 2 | 1 | 1 |
| 3 | 0 | 1 |
| 4 | 1 | 2 |
| 5 | 0 | 2 |
| 6 | 1 | 3 |
| 7 | 0 | 3 |

APPARATUS AND METHOD FOR SELECTING REDUNDANCY VERSION

CROSS-REFERENCE TO RELATED APPLICATIONS

Pursuant to 35 U.S.C. § 119(a), this application claims the benefit of earlier filing date and right of priority to Korean Application No. 116559/2004, filed on Dec. 30, 2004, the contents of which is hereby incorporated by reference herein in its entirety

BACKGROUND OF THE INVENTION

1. Field of the Invention

The present invention relates to a High Speed Downlink Packet Access (HSDPA) communications system and, more particularly, to an apparatus and method for selecting a Redundancy Version (RV) of a Hybrid Automatic Retransmission reQuest (HARQ).

2. Description of the Related Art

As an evolution of the asynchronous IMT-2000 standard, the HSDPA refers to a packet dedicated access technique used for high speed downlink data transmissions and is a main feature of the Release 5 standards specification of the 3GPP (3rd Generation Partnership Project). In particular, HSDPA is recognized as an effective technique for providing Internet Protocol (IP) multimedia services, which has been recently gaining much attention with the remarkable enhancement of data transmission rates.

A core technology of HSDPA for improving transmission efficiency includes Adaptive Modulation and Coding (AMC), HARQ, and Node B scheduling. In order to effectively use the link adaptive techniques adopted for HSDPA, such as AMC or HARQ, control elements or components to control these functions need to be physically located as close to the wireless access interface as possible.

In addition, if an element for handling the data scheduling is located in a radio network controller (RNC), problems related to delays would prevent proper scheduling from being performed for the appropriate channel environment. Thus, for HSDPA, most radio resource control functions including the scheduling function are preferably handled by the base station (Node B), rather than by the RNC.

The HARQ technique aims to enhance the transmission efficiency of packet data by combining FEC (Forward Error Correction) together with ARQ techniques. Specifically, HARQ is a method that combines the characteristics of FEC, such as correcting the erroneous data up to a certain range when transmitted data contains an error, and the characteristics of the ARQ, such as re-transmitting data transmission failures.

Accordingly, in a system employing HARQ, when a reception side, or receiver, fails to recover a data packet, it requests re-transmission of the corresponding packet from a transmission side, or transmitter. In order to enhance error recovery performance of the system, the reception side combines newly received packet data and stored packet data before performing a decoding process. As used herein, "re-transmission" refers to packet re-transmission for recovering error-generated data.

In a WCDMA (Wideband Code Division Multiple Access) HSDPA system, an output of the turbo encoder includes systematic bits carrying row data, such as user information, and parity bits, or redundancy information, carrying information created based on the user information. In addition, in the WCDMA HSDPA system, eight Redundancy Versions (RVs) can be selected in performing re-transmissions according to the HARQ method and the eight RVs have a different data structure, respectively.

The data structure of the RV is determined by a combination of two parameters, such as "s" and "r," or three parameters, such as "s," "r" and "b." Among the parameters, the "s" parameter is used for allocating priority to either the systematic bits or the parity bits of a turbo code, the "r" parameter is used for puncturing and repetition and the "b" parameter is used for changing a position of constellation. The "b" parameter is applicable only for 16QAM (Quadrature Amplitude Modulation).

In the WCDMA HSDPA system, the throughput of the system differs depending upon which combination of RVs is selected in the re-transmission. Therefore, the RVs are selected in order to maximize the system throughput in each re-transmission.

In re-transmission, an MCS (Modulation and Coding Selection) level is not changed. Therefore, in order to obtain a maximum throughput, an RV that can minimize a BLER (Block Error Rate) must be selected. In this respect, the RV that can minimize the BLER differs depending upon each MCS or upon the number of times of re-transmission.

Accordingly, in order to measure the throughput of the system and select an RV that can maximize the system throughput in the related art HARQ method, simulation must be performed on every MCS received from the reception side, for example, a terminal, according to the number of times re-transmission is performed. However, since the related art HARQ method performs the simulation with respect to every MCS according to the number of times re-transmission is performed, a large number of simulations must be performed. Furthermore, if the specification or particulars of the system is changed, the large number of simulations must be performed again.

Therefore, there is a need for an apparatus and method for selecting an RV to maximize throughput when performing HARQ transmissions without requiring a large number of simulations to be performed. The present invention addresses these and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to provide an apparatus and method for selecting an RV to maximize throughput for HARQ transmissions. By considering coding gain that varies according to a coding rate and a balance between the energy per systematic bit and the energy per parity bit in a systematic and procedural manner, an RV can be selected to maximize throughput without the need for special algorithms.

In one aspect of the present invention, an apparatus for selecting a redundancy version for performing transmissions according to a hybrid automatic retransmission request (HARQ) in a communications system is provided. The apparatus includes a controller adapted to set a plurality of parameter values and a processor adapted to select a redundancy version based on the plurality of parameter values and to transmit data using the selected redundancy version.

It is contemplated that the controller is further adapted to set a first parameter value and a second parameter value, the first parameter used to determine priority between systematic bits and parity bits and the second parameter value used to control puncturing or repetition. It is further contemplated that the controller is further adapted to compare a code rate with a first threshold if a current transmission is a re-transmission.

It is contemplated that the controller is further adapted to set the first parameter value to give priority to parity bits if the code rate is greater than the first threshold. It is further contemplated that the controller is further adapted to determine a ratio of systematic bits energy to parity bits energy and compare the ratio with a second threshold if the code rate is less than the first threshold.

It is contemplated that the controller is further adapted to set the first parameter value to give priority to parity bits if the ratio is greater than the second threshold and to set the first parameter value to give priority to systematic bits if the ratio is less than the second threshold. It is further contemplated that the controller is further adapted to set the first parameter value to give priority to systematic bits if a current transmission is not a re-transmission.

It is contemplated that the controller is further adapted to set the second parameter to a value that is different from a value to which the second parameter was set in a previous transmission. It is contemplated that the redundancy version is related to 16 quadrature amplitude modulation (QAM).

It is contemplated that the controller is further adapted to set a third parameter value, the third parameter value used to change a position of a constellation if the redundancy version is related to quadrature phase shift keying (QPSK). Preferably, the controller is further adapted to set the third parameter to a value that is different from a value to which the third parameter was set in a previous transmission.

It is contemplated that the communication system is based on either a high speed downlink packet access (HSDPA) or wideband code division multiple access (WCDMA). It is further contemplated that the processor is a hybrid ARQ functionality.

In another aspect of the present invention, a method for selecting a redundancy version for performing transmissions according to a hybrid automatic retransmission request (HARQ) in a communications system is provided. The method includes setting a plurality of parameter values, selecting a redundancy version based on the plurality of parameter values and transmitting data according to the selected redundancy version.

It is contemplated that setting the plurality of parameter values includes setting a first parameter used to determine priority between systematic bits and parity bits and setting a second parameter value used to control puncturing or repetition. It is further contemplated that setting the first parameter includes comparing a code rate with a first threshold if a current transmission is a re-transmission.

It is contemplated that setting the first parameter further includes setting the first parameter value to give priority to parity bits if the code rate is greater than the first threshold and determining a ratio of systematic bits energy to parity bits energy if the code rate is less than the first threshold. It is further contemplated that setting the first parameter further includes determining that the code rate is less than the first threshold and comparing the ratio with a second threshold.

It is contemplated that setting the first parameter further includes setting the first parameter value to give priority to parity bits if the ratio is greater than the second threshold and setting the first parameter value to give priority to systematic bits if the ratio is less than the second threshold. It is further contemplated that setting the first parameter includes setting the first parameter value to give priority to systematic bits if a current transmission is not a re-transmission.

It is contemplated that setting the second parameter includes setting the second parameter to a value that is different from a value to which the second parameter was set in a previous transmission. It is further contemplated that the communication system is based on either a high speed downlink packet access (HSDPA) or wideband code division multiple access (WCDMA).

It is contemplated that the method further includes setting a third parameter used to change a position of a constellation. Preferably, setting the third parameter includes setting the third parameter to a value that is different from a value to which the third parameter was set in a previous transmission.

In another aspect of the present invention, a method for maximizing throughput for transmissions according to a hybrid automatic retransmission request (HARQ) in a communications system is provided. The method includes setting at least one parameter value to obtain an optimal redundancy version, the at least one parameter value set in consideration of a priority for systematic bits and parity bits, the priority dependent upon whether a transmission or re-transmission is being performed and transmitting data according to the optimal redundancy version.

It is contemplated that setting the at least one parameter value includes considering a coding gain that varies according to a code rate and considering a ratio between energy per systematic bit and energy per parity bit. It is further contemplated that the method further includes determining that a re-transmission is not being performed and setting the at least one parameter value to give priority to systematic bits.

It is contemplated that the method further includes determining that a re-transmission is being performed, comparing a code rate with a first threshold and setting the at least one parameter value to give priority to parity bits if the code rate is greater than the first threshold and determining a ratio of systematic bits energy to parity bits energy if the code rate is less than the first threshold. It is further contemplated that the method further includes determining that the code rate is less than the first threshold, comparing the determined ratio with a second threshold, setting the at least one parameter value to give priority to parity bits if the ratio is greater than the second threshold and setting the at least one parameter value to give priority to systematic bits if the ratio is less than the second threshold.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 3 is an RV table for 16QAM.

FIG. 4 is an RV table for QPSK.

DETAILED DESCRIPTION OF THE PREFERRED EMBODIMENTS

The present invention relates to an apparatus and method for selecting an RV to maximize throughput for HARQ transmissions. Although the present invention is illustrated with respect to 16QAM and QPSK, it is contemplated that the invention may be utilized whenever it is desired to increase throughput when performing HARQ transmission.

In performing a re-transmission, the two major factors affecting the system throughput are a coding gain varied according to a code rate and a balance between the energy per systematic bit and the energy per parity bit. The present invention provides a method for easily and quickly selecting an optimum redundancy value (RV) with respect to a size of an arbitrary transport block by considering these two factors in a systematic and procedural manner.

As mentioned previously, the parameter "r" is required for obtaining a diversity gain related to time and the parameter "b" is required to obtain a diversity gain related to constellation. Accordingly, in order to maximize the diversity gain, the parameters "r" and "b" can be set such that parameter values which have not been used in a previous transmission are sequentially used, thereby avoiding the need for a special algorithm or procedure to set the parameters "r" and "b." An essential aspect of the present invention lies in a procedure for determining the parameter "s" to determine the priority of the systematic bits and the parity bits.

Figure 1:
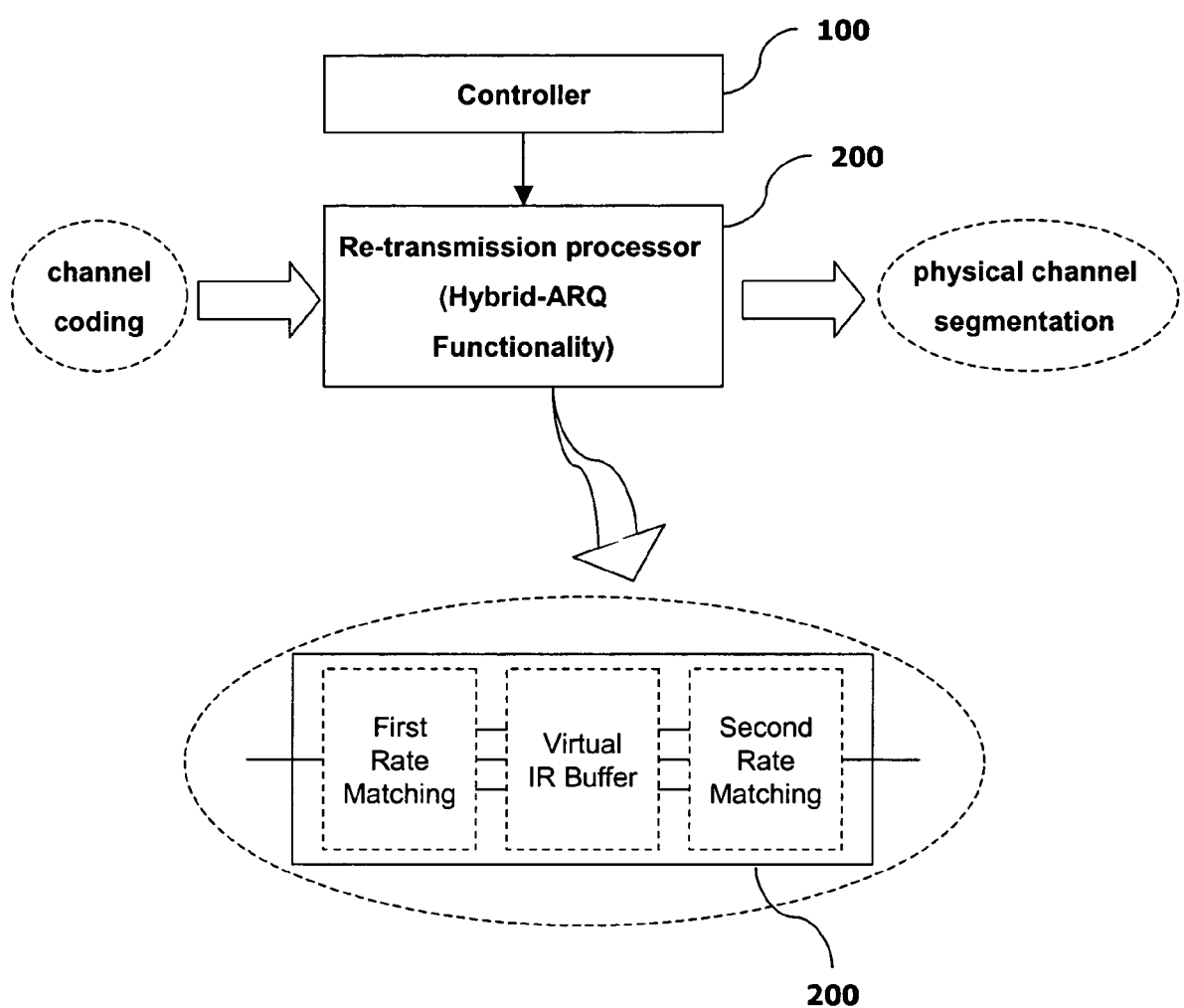
FIG. 1 is a schematic block diagram illustrating an apparatus for selecting a redundancy version (RV) in accordance with the present invention.

FIG. 1 is a schematic block diagram illustrating an apparatus for selecting a redundancy version (RV) in accordance with the present invention. As illustrated in FIG. 1, the apparatus for selecting an RV in accordance with the present invention includes a controller 100 for setting parameter values of an RV and a re-transmission processor 200, such as a HARQ functionality, for selecting an RV based on the parameter values and performing a transmission procedure according to the selected RV.

Figure 2:
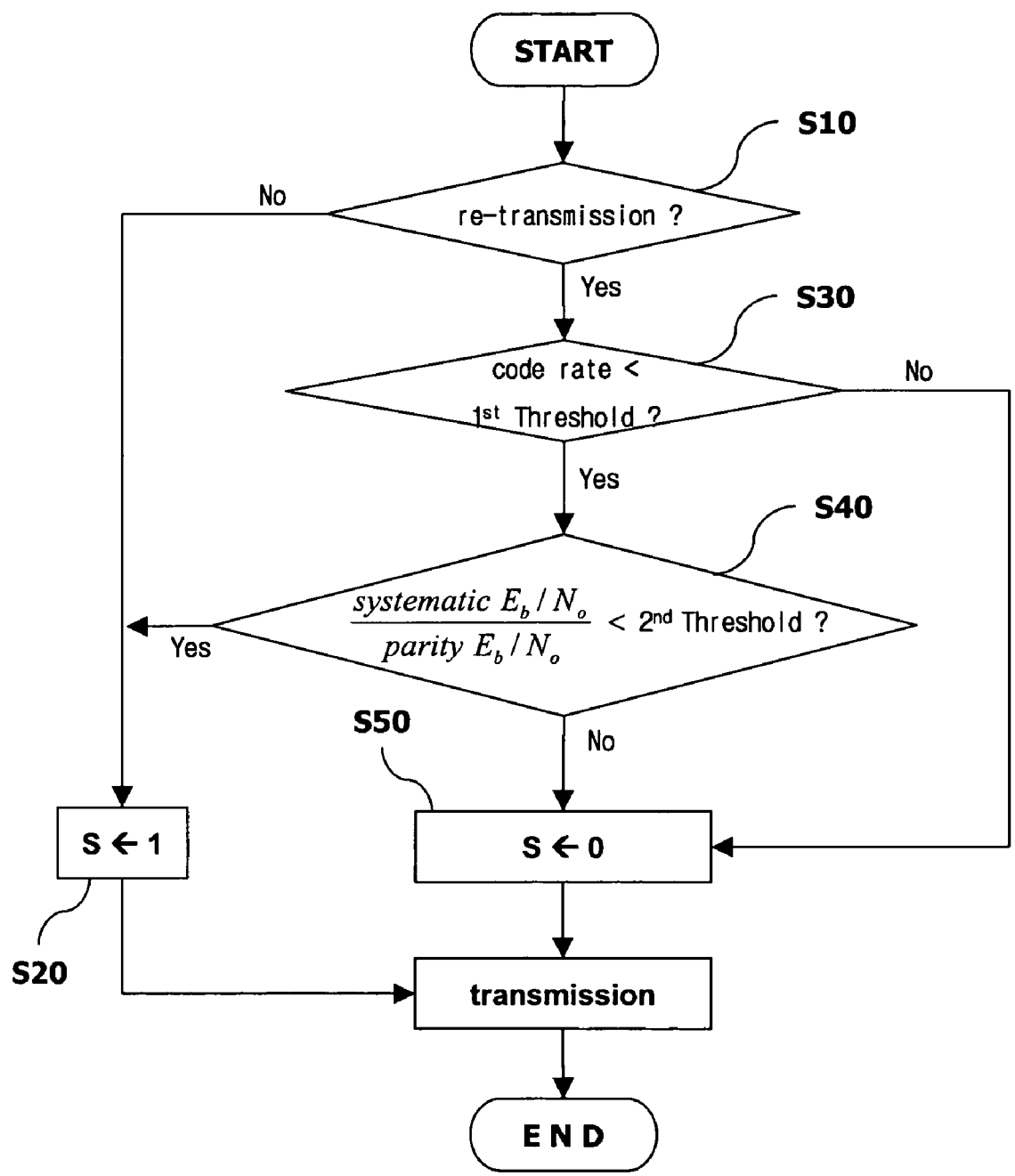
FIG. 2 is a flow chart illustrating a method for setting parameters in accordance with the present invention.

FIG. 2 is a flow chart illustrating a method for setting parameters in accordance with the present invention. The procedure for setting the parameter "s" is described with reference to FIG. 2.

When a previously transmitted packet has an error, a reception side, such as a terminal, requests re-transmission of the corresponding packet from the transmission side, such as a base station. Upon receiving the request from the terminal, the base station selects one of eight RVs (X0~X7), specifically an RV that can maximize throughput of an optimum system. As mentioned above, the RV (Xrv) is a combination of parameters, such a "s," "r" and "b" or "s" and "r."

FIG. 3 is an RV table for 16QAM (Quadrature Amplitude Modulation) and FIG. 4 is an RV table for QPSK (Quadrature Phase Shift Keying). As illustrated in FIGS. 3 and 4, the RV (X0~X7) of the 16QAM are a combination of the parameters "s," "r" and "b" and the RV (X0~X7) of the QPSK are a combination of the parameters of "s" and "r."

In order to set the parameter "s," the controller 100 checks whether a current transmission is a re-transmission (step S10). If the current transmission is not a re-transmission, for example, if the current transmission is an initial transmission, the controller 100 sets the parameter "s" to give priority to the systematic bits related to turbo code, for example, '1'→"s" (step S20).

The systematic bits are important because they carry row data such as user information, so all of the system bits must be transmitted. Therefore, if an initial transmission is performed, the controller sets the parameter "s" to '1', constructs a block of transmission data primarily with systematic bits, and transmits the data. If, however, the current transmission is a re-transmission, the controller 100 compares its code rate with a first threshold (step S30).

If the code rate is greater than the first threshold, the controller 100 increases a coding gain by setting the parameter "s" to give priority to parity bits, for example, '0'→"s" (step S50). The value of the first threshold compared with the code rate may be an experimental value obtained by simulation or a system analysis.

If the code rate is less than the first threshold, the controller 100 determines a ratio, represented by "R," of systematic bits energy, represented by "systematic Eb/No," to parity bits energy, represented by "parity Eb/No" and compares the ratio with a second threshold (step S40). If the energy ratio is greater than the second threshold, the controller 100 increases the coding gain by setting the parameter "s" to give priority to the parity bits, for example '0'→"s" (step S50). If, however, the energy ratio is less than the second threshold value, the controller 100 sets the parameter "s" to give priority to the systematic bits, for example, '1'→"s" (step S20).

The equation below is a mathematic equation indicating the ratio "R" of the systematic bits energy "systematic Eb/No" to the parity bits energy "parity Eb/No."

$$R = \frac{\text{sysmatic } E_b/N_o}{\text{parity } E_b/N_o}$$

The procedure for setting the parameter "r" is simpler than the procedure for setting the parameter "s." As mentioned previously, "r" is a parameter related to puncturing and repetition. As used herein, "puncturing" refers to adjusting the data to be transmitted into a size of a transport block by removing a portion of information when the amount of data received as an input to a second rate matching unit is larger than the size of the transport block and "repetition" refers to adjusting data to be transmitted into a size of a transport block by repeating a portion of information when the amount of data received as an input to the second rate matching unit is smaller than the size of the transport block.

The WCDMA HSDPA system performs data transmissions by using the turbo code technique and a minimum code rate of the WCDMA HSDPA for obtaining a maximum coding gain is ⅓. In the initial transmission, if the amount of data input to the second rate matching unit is smaller than the amount of data that can be transmitted, specifically smaller than the size of the transport block, the repetition procedure is performed. Otherwise, the puncturing procedure is performed.

When puncturing is performed in the initial transmission, puncturing is also performed in the re-transmission and, when the repetition is performed in the initial transmission, repetition is also performed in the re-transmission. Accordingly, in determining the parameter "r" in the re-transmission, the controller 100 alternately selects '0' and '1' to perform repetition, or puncturing, primarily on bits that have not been repeated, or punctured, in a previous transmission, for example, an initial transmission.

Specifically, if the parameter "r" is set to '0' in the initial transmission, the controller sets the parameter "r" to '1' in the re-transmission. Conversely, if the parameter "r" is set to '0' in the initial transmission, the controller sets "r" to '1' in the re-transmission.

As indicated previously, "b" is a parameter related to changing a position of constellation in the 16QAM. The procedure for setting the parameter "b" is the same as the aforementioned procedure for setting the parameter "r."

Because the BLER (Block Error Rate) is different at every position of the constellation, the controller 100 sets the parameter "b" to a different value than was set for a previous transmission for example, an initial transmission. Specifically, if the parameter "b" is set to '0' in the previous transmission, for example, an initial transmission, the parameter "b" is set to a different value, such as '1', '2' or '3', in the re-transmission in order to change the position in the constellation.

Through the procedures of the present invention, when the controller 100 sets "s," "r" and "b" or "s" and "r," the re-transmission processor 200 selects a corresponding RV from the RV table of the 16QAM or the RV table of the QPSK and performs the transmission procedure according to the selected redundancy version. The apparatus and method for selecting a redundancy version (RV) of a hybrid automatic retransmission request (HARQ) in accordance with the present invention has several advantages.

First, a more systematic and procedural algorithm for RV selection can be obtained by determining the parameter "s" by using the two important factors affecting the system throughput, specifically the coding gain that varies according to the code rate and the balance between energy per systematic bit and energy per parity bit. Additionally, unlike conventional methods in which a large number of simulations must be performed to select an optimum RV, an optimum RV can be selected quickly and effectively with respect to a size of an arbitrary transmission block using the present invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of selecting a redundancy version for a hybrid automatic retransmission request (HARQ) to transmit data in a communications system, the method comprising:

setting a plurality of parameters associated with a HARQ;

selecting a redundancy version for the HARQ based on the plurality of parameters; and transmitting the data according to the selected redundancy version, wherein the plurality of parameters comprises a first parameter used to determine priority between systematic bits and parity bits, wherein setting the first parameter comprises:

comparing a code rate with a first threshold;

giving priority to the parity bits, in response to determining that the code rate is greater than the first threshold; and comparing a ratio of an energy of the systematic bits to an energy of the parity bits with a second threshold, in response to determining that the code rate is less than the first threshold.

2. The method of 1, wherein setting the first parameter further comprises giving priority to the parity bits, in response to determining that the ratio is greater than the second threshold.

3. The method of claim 1, wherein setting the first parameter further comprises giving priority to the systematic bits, in response to determining that the ratio is less than the second threshold.

4. The method of claim 1, wherein the plurality of parameters comprises a second parameter used to control puncturing or repetition.

5. The method of claim 4, wherein setting the second parameter comprises setting the second parameter to a value that is different from a value to which the second parameter was set in a previous transmission of the data.

6. The method of claim 1, wherein the plurality of parameters comprises a third parameter used to change a position of a constellation.

7. The method of claim 6, wherein setting the third parameter comprises setting the third parameter to a value that is different from a value to which the third parameter was set in a previous transmission of the data.

8. A method of selecting a redundancy version for a hybrid automatic retransmission request (HARQ) to transmit data in a communications system based on high speed down link packet access (HSDPA), the method comprising:

setting a plurality of parameters associated with a HARQ;

selecting a redundancy version for the HARQ based on the plurality of parameters; and transmitting the data according to the selected redundancy version, wherein the plurality of parameters comprises a first parameter used to determine priority between systematic bits and parity bits, wherein setting the first parameter comprises:

comparing a code rate with a first threshold;

giving priority to the parity bits, in response to determining that the code rate is greater than the first threshold; and comparing a ratio of an energy of the systematic bits to an energy of the parity bits with a second threshold, in response to determining that the code rate is less than the first threshold.

9. A method of selecting a redundancy version for a hybrid automatic retransmission request (HARQ) to transmit data in a communications system based on wideband code division multiple access (WCDMA), the method comprising:

setting a plurality of parameters associated with a HARQ;

selecting a redundancy version for the HARQ based on the plurality of parameters; and transmitting the data according to the selected redundancy version, wherein the plurality of parameters comprises a first parameter used to determine priority between systematic bits and parity bits, wherein setting the first parameter comprises:
  comparing a code rate with a first threshold;
  giving priority to the parity bits, in response to determining that the code rate is greater than the first threshold; and
  comparing a ratio of an energy of the systematic bits to an energy of the parity bits with a second threshold, in response to determining that the code rate is less than the first threshold.

* * * * *